UNITED STATES PATENT OFFICE.

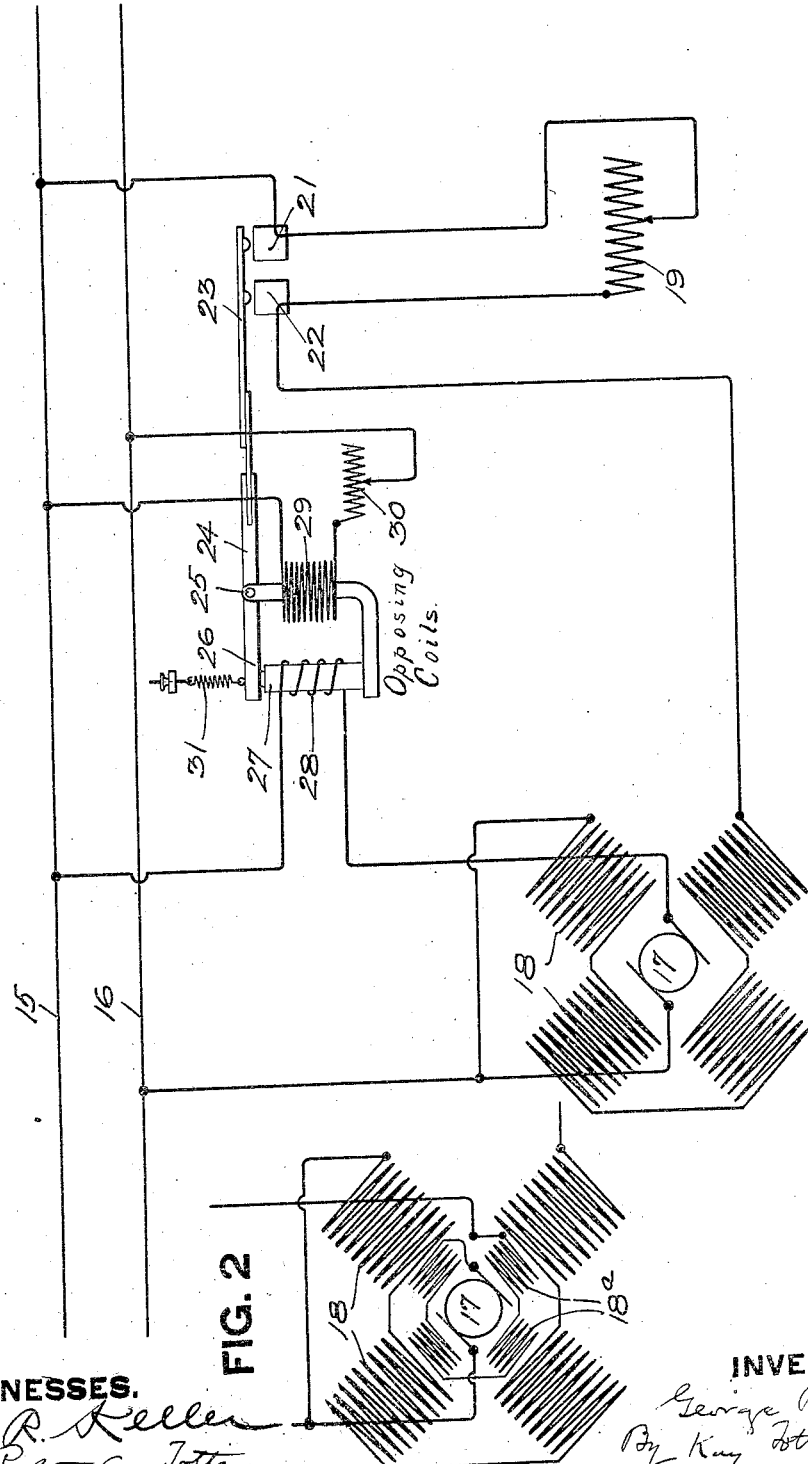

GEORGE BAEHR, OF McKEESPORT, PENNSYLVANIA, ASSIGNOR TO NATIONAL TUBE COMPANY, OF PITTSBURG, PENNSYLVANIA, A CORPORATION OF NEW JERSEY.

AUTOMATIC SPEED-INCREASING DEVICE.

No. 819,707. Specification of Letters Patent. Patented May 8, 1906.

Application filed September 17, 1904. Serial No. 224,895.

*To all whom it may concern:*

Be it known that I, GEORGE BAEHR, a resident of McKeesport, in the county of Allegheny and State of Pennsylvania, have invented a new and useful Improvement in Automatic Speed-Increasing Devices; and I do hereby declare the following to be a full, clear, and exact description thereof.

My invention relates to electric-motor systems; and its object is to provide a system of this kind whereby a motor can be driven at two speeds—a low speed and a high speed—and whereby the change from the one speed to the other will be brought about automatically by the load on said motor.

More specifically stated, the object of my invention is to provide a system of this character which is adapted to drive a motor at a given low speed when running idle or under a friction or light load and at a greater speed when running under a heavier load, this result being brought about by automatically varying the resistance of the motor-field.

The invention also consists in providing a system of the character specified with manually-controlled means whereby the system may be set to secure various rates of speed of the motor when running at its higher speed and in which when so set the change from the low to the higher speed will take place automatically.

In many industrial plants the machines are used intermittently, and the nature of the work is such that when the load is put on the machine, or, in other words, when the material to be operated upon is presented to the machine, the latter should not exceed a certain speed; otherwise it is difficult to handle the work or there is liability of damaging the same. It frequently occurs, however, that after the work has been begun the machine can be considerably speeded up without detrimentally affecting the work and sometimes with the effect of improving it. If a constant-speed or a constant-current motor be employed for driving such machines, it will run at substantially the same speed when the machine is running idle as when the load is thrown thereon, and as a result the output of the machine will only be so much as it is capable of producing at the low speed at which the machine must be run when the work is first presented thereto.

The object of my invention is to provide an electric-motor system whereby machines of the character described can when idle or under a friction load run at a comparatively slow speed and without wasting the current, but whereby when the load is put on said machine the field of the motor will be automatically weakened, so that the motor and the machine driven thereby will be speeded up.

My invention also consists in certain details of arrangement of the system, as will hereinafter appear.

In the accompanying drawings, Figure 1 shows diagrammatically one arrangement of my motor system, and Fig. 2 is a detail view showing a compound-wound motor in place of the series-wound motor of Fig. 1.

In the drawings the power-mains are shown at 15 and 16.

The translating device of the system is represented by a motor whose armature is shown at 17 and field-magnet coils at 18. The motor-armature will be connected by suitable intermediate gearing to the machine or machines to be driven. The motor illustrated in Fig. 1 is of the shunt-wound type.

In series with the field-magnets of the motor is a resistance device 19, which may be of any suitable form and which preferably will be adjustable manually, so that it can be regulated at will. This resistance device is arranged to be cut into or out of circuit with the field-magnets of the motor automatically, according to the change of the motor from its friction or idle load to its heavy load. The arrangement is such that when the motor is running idle or under its friction load the resistance device will be short-circuited, thus permitting the field to be at its maximum strength and decreasing the speed of the motor, whereas when the load comes on the motor the short circuit will be broken, thus placing the resistance device in series with the field-magnets, and thereby increasing the speed of the motor, all in a manner well known to those skilled in the art. This result may be accomplished in various ways. In the drawings is shown an automatic magnetic circuit making and breaking device for controlling the short circuit of the resistance 19. This circuit-controlling device consists of two terminals 21 and 22, located in the circuit on opposite sides of the resistance device 19, together with a conducting member 23, arranged to bridge said terminals, and thus form a circuit for such resistance device. The bridge-piece 23 is connected to and insulated from a lever 24, pivoted at 25 and having an armature 26 lying opposite the pole 27 of a suitable electromagnet. This magnet is provided with two coils, the coil 28 being in series with the armature 17 of the motor, while the coil 29 is bridged across the mains 15 and 16. These coils are wound in opposition and have the same number of windings or ampere-turns; but the coil 29 is of finer wire, and therefore has a less current-carrying capacity than the coil 28. An adjustable resistance 30 is placed in series with the coil 29. An adjustable spring 31 acts on the armature 26 to normally hold the same away from the pole 27 of the magnet and to normally keep the bridge-piece 23 in contact with the terminals 21 and 22, so as to normally short-circuit the resistance device 19.

In the operation of the motor system described the resistance device 30 will be so adjusted that the coil 29 will exactly balance the coil 28 when the motor is running idle or under its friction load. As the two coils are wound in opposition, no magnetic lines of force will be manifest at the pole 27, and as a consequence the spring 31 will maintain the short circuit around the resistance device 19, so that the field of the motor will be at its maximum strength. This will give a relatively low speed to the motor, and as a consequence the machine connected to the motor will be driven at such a low speed that the work can be safely presented thereto. As soon, however, as the work is fairly presented to the machine an additional strain or load is thrown on the motor. This, as is well understood, will slightly decrease the speed of the motor-armature, thus causing an increased flow of current through said armature. This increased current also passes through the coil 28 of the magnet, thus overbalancing the coil 29 and creating magnetic lines of force at the pole 27. This will attract the armature 26, which, through the lever 24, will lift the bridge-piece 23, thus breaking the short circuit around the resistance device 19 and placing said resistance in series with the field of the motor. As a result the motor-field will be weakened and said motor will speed up, as will be readily understood by those skilled in the art. As soon as the work is withdrawn from the machine the load on the motor will suddenly and sharply decrease. This will cause the armature to momentarily speed up, thus increasing the counter electromotive force thereof and cutting down the current flowing through said armature. As a result the current flowing through the coil 28 will also be decreased to such an extent that it will again be balanced by the current flowing through the balancing-coil 29. Hence the magnetic field at the pole 27 of the magnet will be destroyed or at least so far reduced that the spring 31 will be able to draw the armature 26 away from the magnet-pole and again establish the short circuit around the resistance device 19. The strength of the motor-field will therefore be again increased, and said motor will run at the lower speed. A compound-wound motor is also adapted for the purpose, this being shown in Fig. 2, the same having in addition to the shunt-coils 18 the series coils 18$^a$. The compound-wound motor, however, has shunt-coils, so that in this particular it is the same as the shunt-wound motor, and the connection and regulation will be the same as with the arrangement shown in Fig. 1. By the term "a motor having a field-magnet in shunt with the armature" in the claims I intend to include both the shunt-motor shown in Fig. 1 and also the compound motor shown in Fig. 2, as the latter has "a field-magnet in shunt with its armature."

By the system described the motor is driven at only two speeds—a low speed when running under its friction load and a higher speed when running under the heavier load. The higher speed can be varied by changing the variable-resistance device 19. This is effected manually, so that the apparatus may be set to secure various high speeds, which is desirable for the reason that light work frequently can advantageously be done at a greater speed than heavier work. After being set to secure the desired higher speed the changes from the one speed to the other will be automatically brought about no matter at which higher speed the resistance 19 may be set. This result is not dependent upon any variation in the difference of potential at the motor-terminals, but will be brought about even though the drop in potential should remain constant.

By means of the system described the speed of the motor will be increased and decreased entirely automatically, this being effected entirely by having the load thrown on or withdrawn from the motor. As a result the machines connected to the motor will be driven at such speed that the work can be safely presented thereto and will then be speeded up to very greatly increase the output.

What I claim is—

1. A self-regulating system for electric motors whose armatures are constantly under load, comprising a motor, a source of current therefor, and automatic means controlled by the load on the motor and arranged to decrease the strength of the motor-field when the load on the motor-armature is increased, and to increase the strength of said field when the load on the motor-armature is decreased.

2. A self-regulating system for electric motors whose armatures are constantly under load, comprising a motor, a source of current therefor, and electrically-actuated means controlled automatically by the load on the motor and arranged to decrease the strength of the motor-field when the load on the motor-armature is increased, and to increase the strength of said field when the load on the motor-armature is decreased.

3. A self-regulating system for electric motors whose armatures are constantly under load, comprising a motor, a source of current therefor, automatic means controlled by the load on the motor and arranged to increase he resistancet of the motor field-circuit when the load on the armature increases, and to decrease the resistance of said field-circuit when the load on the armature decreases, and manually-controlled means for varying the higher resistance of said field-circuit.

4. A self-regulating system for electric motors whose armatures are constantly under load, comprising a motor, a source of current therefor, and means actuated by the current flowing through the motor-armature and arranged to decrease the strength of the motor-field when an increased current flows through the motor-armature, and to increase the strength of the motor-field on a decrease of said current through the armature.

5. In an electric-motor system, the combination of a motor having a shunt-field, a source of current therefor, and means for regulating the strength of the motor-field, said means comprising an electromagnet having a coil in series with the motor-armature and a balancing-coil in shunt with the motor armature and field.

6. In an electric-motor system, the combination of a motor, a source of current therefor, a resistance device, and means for cutting said resistance device into and out of series with the motor-field, said means comprising an electromagnet having a coil in series with the motor-armature and a balancing-coil in shunt with the motor armature and field.

7. In an electric-motor system, the combination of a motor having a field-magnet in shunt with its armature, a source of current therefor, a resistance device, and automatic means arranged to cut said resistance device into and out of series with said shunt-field, said means comprising an electromagnet having a coil in series with the motor-armature and a balancing-coil in shunt with the armature and field.

8. In an electric-motor system, the combination of a motor having a field-magnet in shunt with its armature, a source of current therefor, a manually-variable resistance device, and automatic means arranged to place said resistance device in series with said shunt-field magnet and to short-circuit the same, said means comprising an electromagnet having a coil in series with the motor-armature and a balancing-coil in shunt with the motor armature and field.

9. In an electric-motor system, the combination of a motor having a field-magnet in shunt with its armature, a source of current therefor, and means for varying the strength of said shunt field-magnet, said means comprising an electrically-actuated device adjusted to the friction load of the motor and having a coil in series with the motor-armature and a balancing-coil in shunt with the motor armature and field.

10. In an electric-motor system, the combination with a motor having a field-magnet in shunt with the armature, of a source of current therefor, a resistance device in series with the motor field-magnet, a short circuit for said resistance device which is normally maintained, a circuit-breaker in said short circuit, and means for operating said circuit-breaker, said means comprising a coil in series with the motor-armature and a balancing-coil acting in opposition to the first-named coil and in shunt with the motor armature and field.

11. In an electric-motor system, the combination with a motor having a field-magnet in shunt with the armature, of a source of current therefor, a resistance in series with the motor field-magnet, a short circuit therefor which is normally maintained, a circuit-controller in said short circuit, and means for operating said circuit-controller comprising a magnet having two coils, one coil being in series with the motor-armature and the other coil being wound in opposition thereto and being in shunt with the motor armature and field, and means for varying the strength of said balancing-coil.

12. In an electric-motor system, the combination with a motor having a field-magnet in shunt with the armature, of a source of current therefor, a circuit-controller arranged to vary the strength of said shunt field-magnet, and a magnet for operating said circuit-controller, said magnet comprising a coil in series with the motor-armature and a balancing-coil wound in opposition to said first-named coil and being in shunt with the motor armature and field.

13. In an electric-motor system, the combination with a motor having a field-magnet in shunt with the armature, of a source of current therefor, a circuit-controller arranged to vary the strength of said shunt field-magnet, a magnet for operating said circuit-controller, said magnet comprising a coil in series with the motor-armature, a balancing-coil acting in opposition thereto and in shunt with the motor armature and field, and means for varying the strength of said last-named coil.

In testimony whereof I, the said GEORGE BAEHR, have hereunto set my hand.

GEORGE BAEHR.

Witnesses:
 ROBERT C. TOTTEN,
 G. KREMER.